(12) United States Patent
Hayashida et al.

(10) Patent No.: US 7,866,808 B2
(45) Date of Patent: Jan. 11, 2011

(54) INK SET FOR INK-JET RECORDING AND METHOD FOR PRODUCING TETRACOMPOSITE BLACK IMAGE

(75) Inventors: Kenta Hayashida, Inazawa (JP); Yasuhiro Taga, Nagoya (JP); Kazuma Goto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 265 days.

(21) Appl. No.: 12/048,338

(22) Filed: Mar. 14, 2008

(65) Prior Publication Data

US 2008/0226825 A1 Sep. 18, 2008

(30) Foreign Application Priority Data

Mar. 16, 2007 (JP) ............................. 2007-069602

(51) Int. Cl.
*B41J 2/01* (2006.01)
(52) U.S. Cl. .................................... 347/100; 106/31.27
(58) Field of Classification Search ............. 106/31.27, 106/31.13; 347/100
See application file for complete search history.

(56) References Cited

U.S. PATENT DOCUMENTS

| | | | |
|---|---|---|---|
| 6,702,882 B2* | 3/2004 | Yakushigawa et al. | 106/31.27 |
| 6,733,120 B2* | 5/2004 | Ogasawara et al. | 347/100 |
| 6,866,380 B2* | 3/2005 | Yakushigawa et al. | 347/100 |
| 7,615,112 B2* | 11/2009 | Hayashida et al. | 106/31.27 |
| 2006/0048672 A1* | 3/2006 | Sugimoto et al. | 106/31.27 |
| 2006/0082629 A1* | 4/2006 | Kato et al. | 347/100 |
| 2007/0022902 A1* | 2/2007 | Koga | 106/31.27 |
| 2007/0046752 A1* | 3/2007 | Hamajima et al. | 347/100 |
| 2007/0186808 A1* | 8/2007 | Hamajima et al. | 106/31.49 |
| 2007/0188573 A1* | 8/2007 | Hamajima et al. | 347/100 |
| 2007/0188574 A1* | 8/2007 | Kato et al. | 347/100 |
| 2008/0168923 A1* | 7/2008 | Iwamura et al. | 106/31.13 |
| 2008/0274339 A1* | 11/2008 | Bauer et al. | 428/195.1 |
| 2008/0286465 A1* | 11/2008 | Sago | 427/256 |
| 2008/0286468 A1* | 11/2008 | Sago | 427/288 |
| 2008/0302270 A1* | 12/2008 | Taniguchi et al. | 106/31.45 |

FOREIGN PATENT DOCUMENTS

JP 2005-036164 2/2005

* cited by examiner

*Primary Examiner*—Matthew Luu
*Assistant Examiner*—Rut Patel
(74) *Attorney, Agent, or Firm*—Banner & Witcoff, Ltd.

(57) ABSTRACT

An ink set for ink-jet recording includes a dye yellow ink, a dye magenta ink, a dye cyan ink, and a dye black ink, wherein regarding a reduction rate in OD value between before and after a predetermined lightfastness test of each patch in the case where a patch of each ink is subjected to the lightfastness test, the order of levels of reduction rates in OD values of a yellow component, a magenta component, and a cyan component in a dye black ink patch is reverse to the order of levels of reduction rates in OD values of a yellow component in the dye yellow ink patch, a magenta component in the dye magenta ink patch, and a cyan component in the dye cyan ink patch.

2 Claims, 4 Drawing Sheets

PRIOR ART

INK SET FOR INK-JET RECORDING AND METHOD FOR PRODUCING TETRACOMPOSITE BLACK IMAGE

CROSS REFERENCE TO RELATED APPLICATION

The present invention claims a priority from Japanese Patent Application No. 2007-69602, which was filed on Mar. 16, 2007, the disclosure of which is herein incorporated by reference in its entirety.

BACKGROUND

1. Field of the Invention

The present invention relates to an ink set to be used for ink-jet recording and a method for producing a tetracomposite black image.

2. Description of the Related Art

In the ink-jet recording, an achromatic image is produced by a black ink or by using a yellow ink, a cyan ink, and a magenta ink in combination. However, in the case where a dye is used as a colorant of each ink, a problem occurs in that achromatic color is tinted due to color fading. Under the circumstances, preparation of a black ink by using a water-soluble black dye having a specific structure together with C. I. Direct Red 89 has been proposed in order that achromatic color is not tinted and is maintained even after an achromatic image is preserved for a long time.

In the case where an achromatic region of an image is formed by a black ink alone and the achromatic color is light, a graininess may be produced. In order to prevent an occurrence of this graininess, an achromatic region is sometimes formed by using a black ink, a yellow ink, a magenta ink and a cyan ink in combination. However, color tint may become conspicuous after color fading, whereby an image including the achromatic region may become unnatural.

SUMMARY

According to an aspect of the present invention, an ink set for ink-jet recording, including a dye yellow ink, a dye magenta ink, a dye cyan ink, and a dye black ink, is provided, wherein regarding a reduction rate in OD (optical density) value between before and after a predetermined lightfastness test of each patch in the case where a patch of each ink is formed and the resulting patch is subjected to the lightfastness test, the order of levels of reduction rates in OD values of a yellow component, a magenta component, and a cyan component in the dye black ink patch is reverse to the order of levels of reduction rates in OD values of a yellow component in the dye yellow ink patch, a magenta component in the dye magenta ink patch, and a cyan component in the dye cyan ink patch.

According to an another aspect of the present invention, a method for producing a tetracomposite black image is provided, the method including the step of producing the tetracomposite black image containing a dye yellow ink, a dye magenta ink, a dye cyan ink, and a dye black ink in combination by using an ink set for ink-jet recording, the ink set including the dye yellow ink, the dye magenta ink, the dye cyan ink, and the dye black ink, wherein regarding a reduction rate in OD value between before and after a predetermined lightfastness test of each patch in the case where the patch of each of the dye yellow ink, the dye magenta ink, the dye cyan ink, and the dye black ink is formed and the resulting patch is subjected to the lightfastness test, the order of levels of reduction rates in OD values of a yellow component, a magenta component, and a cyan component in the dye black ink patch is reverse to the order of levels of reduction rates in OD values of a yellow component in the dye yellow ink patch, a magenta component in the dye magenta ink patch, and a cyan component in the dye cyan ink patch.

DESCRIPTION OF THE PREFERRED EMBODIMENTS

Figure 1:
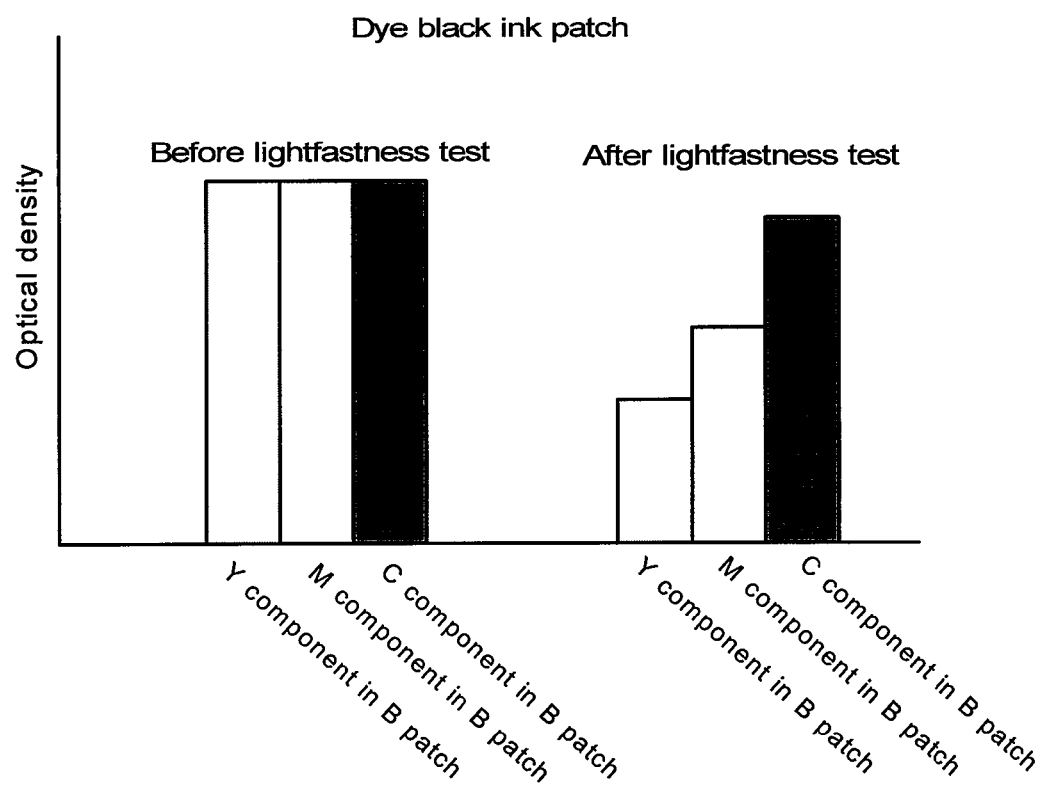
FIG. 1 is a schematic explanatory diagram showing a change in OD value between before and after a lightfastness test of each of a yellow component, a magenta component, and a cyan component of a dye black ink patch printed with a dye black ink.

Regarding an ink set for ink-jet recording, the ink set including, a dye yellow ink, a dye magenta ink, a dye cyan ink and a dye black ink, it is an aspect of the present invention to prevent an achromatic region from being tinted even in the case of (i) forming the achromatic region by using the dye black ink, the dye yellow ink, the dye magenta ink and the dye cyan ink in combination, and of (ii) then exposing the resulting achromatic region to light for the long term.

A dye black ink patch formed from the dye black ink may be divided into a yellow component, a magenta component and a cyan component. According to the finding of the inventors of the present invention, in the case where an ink set was configured in such a way that the order of lightfastness of a yellow component, a magenta component and a cyan component in a dye black ink patch formed from the dye black ink was specified to be reverse to the order of lightfastness of a yellow component in a dye yellow ink patch formed from the dye yellow ink, a magenta component in a dye magenta ink patch formed from the dye magenta ink and a cyan component in a dye cyan ink patch formed from the dye cyan ink, an achromatic region was capable of being prevented from being tinted and good color balance of the entire image was capable of being maintained even (a) when an image including the achromatic region was produced by using the dye black ink, the dye yellow ink, the dye magenta ink and the dye cyan ink in combination and (b) when the resulting achromatic region was exposed to light for a long time. Consequently, the present invention has been completed.

The present invention will be described below in detail with reference to the drawings.

The ink set for ink-jet recording according to an aspect of the present invention is a dye based ink set provided with a dye yellow ink, a dye magenta ink, a dye cyan ink, and a dye black ink.

According to the ink set of the present invention, in the case where an image including an achromatic region is produced by using the dye black ink, the dye yellow ink, the dye magenta ink, and the dye cyan ink in combination, the order of levels of reduction rates in OD values of the yellow component, the magenta component, and the cyan component in the dye black ink patch is reverse to the order of levels of reduction rates in OD values of the yellow component in the dye yellow ink patch formed from the dye yellow ink, the magenta component in the dye magenta ink patch formed from the dye magenta ink, and the cyan component in the dye cyan ink patch formed from the dye cyan ink. Consequently, in the case where the image is exposed to light and the color fading occurs, in the achromatic region, variations between the reduction rates in OD values of the yellow component, the magenta component, and the cyan component in the dye black ink and variations between the reduction rates in OD values of the yellow component in the dye yellow ink, the magenta component in the dye magenta ink, and the cyan component in the dye cyan ink function to cancel each other. As a result, variations between the reduction rates in OD values of the yellow component, the magenta component, and the cyan component in total in the achromatic region are reduced as compared with those in the case where the achromatic region is formed from the black ink alone and in the case where the achromatic region is formed by using the dye yellow ink, the dye magenta ink, and the dye cyan ink in combination. Therefore, this achromatic region is prevented from being tinted unnaturally and the color balance of the entire image becomes good.

In the aspects of the present invention, yellow refers to a color having a lightness (L*) within the range of about 70 or more, and about 100 or less in a L*a*b* calorimetric system (CIE1976: JIS Z8729) on glossy paper, a chroma (C*) within the range of about 55 or more, and about 90 or less, and a hue angle (h) within the range of about 70° or more, and about 140° or less. A yellow ink refers to an ink which may express yellow alone. Magenta refers to a color having a lightness (L*) within the range of about 40 or more, and about 70 or less, a chroma (C*) within the range of about 60 or more, and about 100 or less, and a hue angle (h) within the range of about 320° or more, and about 360° or less or about 0° or more, and about 10° or less. A magenta ink refers to an ink which may express magenta alone. Cyan refers to a color having a lightness (L*) within the range of about 50 or more, and about 85 or less, a chroma (C*) within the range of about 40 or more, and about 80 or less, and a hue angle (h) within the range of about 215° or more, and about 255° or less. A cyan ink refers to an ink which may express cyan alone.

Black refers to a color having a chroma (C*) of about 15 or less in the achromatic region. A black ink refers to an ink which may express black alone.

Tetracomposite black refers to black formed by color mixing or overprinting of a black ink, a yellow ink, a magenta ink, and a cyan ink. The constituent rate of ink dots in the color mixing or overprinting is set in such a way that the rate of black ink (b), yellow ink (y), magenta ink (m), and cyan ink (c) satisfies b:y:m:c=about 0.2 to about 0.8: about 0.2 to about 0.8: about 0.2 to about 0.8: about 0.2 to about 0.8 on a volume rate basis although the rate is changed depending on printers.

The ink set according to an aspect of the present invention is characterized in that regarding a reduction rate in OD value between before and after a predetermined lightfastness test of each patch in the case where a patch of each ink is formed and the resulting patch is subjected to the lightfastness test, the order of levels of reduction rates in OD values of a yellow component, a magenta component, and a cyan component in a dye black ink patch is reverse to the order of levels of reduction rates in OD values of a yellow component in a dye yellow ink patch, a magenta component in a dye magenta ink patch, and a cyan component in a dye cyan ink patch.

It is preferable that an patch of each ink is formed on glossy paper because the ink is less prone to bleed during printing and a vivid color is developed. The glossy paper refers to paper in which base paper (body paper) is provided with a coating layer for giving surface smoothness. Specific examples thereof include, without limitation, glossy photo paper BP61GLA produced by Brother Industries, Ltd.; color ink jet premium glossy photo paper produced by Oji Paper Co., Ltd.; ink-jet printer high-definition photo output high-gloss paper produced by KOKUYO Co., Ltd.; PhotolikeQP <Photo Quality> series produced by KONIKA MINOLTA HOLDINGS, INC.; "SHASIN-SHIAGE Pro", "SHASIN-SHIAGE Advance" of KASSAI® series, and Fuji film High grade glossy paper produced by FUJIFILM Corporation.

It is preferable that a region having an OD value of about 1.0 in the gradation sample of each ink printed on glossy paper is used as the patch of each ink.

The condition of the lightfastness test is not specifically limited insofar as the test common to the patches is performed. For example, the test is performed by using a Xenon lamp as a light source at a temperature in a chamber of 25° C., a relative humidity in the chamber of 50%, and an illuminance of 93 klx for about 100 hours.

The OD value between before and after the lightfastness test of each patch is measured, and the reduction rate in OD value is calculated by the following equation.

$$\text{Reduction rate in OD value}(\%) = \{(\text{OD value before test} - \text{OD value after test})/\text{OD value before test}\} \times 100$$

FIGS. 1 to 4 are diagrams for schematically explaining a change in OD value between before and after a lightfastness test of each of a yellow component, a magenta component, and a cyan component of the ink patch measured as described above. In the drawings, the terms of "B ink", "Y ink", "M ink", and "C ink represent a dye black ink, a dye yellow ink, a dye magenta ink, and a dye cyan ink, respectively. The terms of "B patch", "Y patch", "M patch", and "C patch" represent a dye black ink patch, a dye yellow ink patch, a dye magenta ink patch, and a dye cyan ink patch, respectively. The terms of "Y component", "M component", and "C component" represent a yellow component, a magenta component, and a cyan component, respectively.

As shown in FIG. 1, regarding the dye black ink patch, even when the OD values before the lightfastness test of the yellow component, the magenta component, and the cyan component are equal to each other, the reduction rates in OD values after the lightfastness test of these components are significantly different from each other. Consequently, variations occur between the OD values of these components, and a feeling of color tint may be produced.

Figure 2:
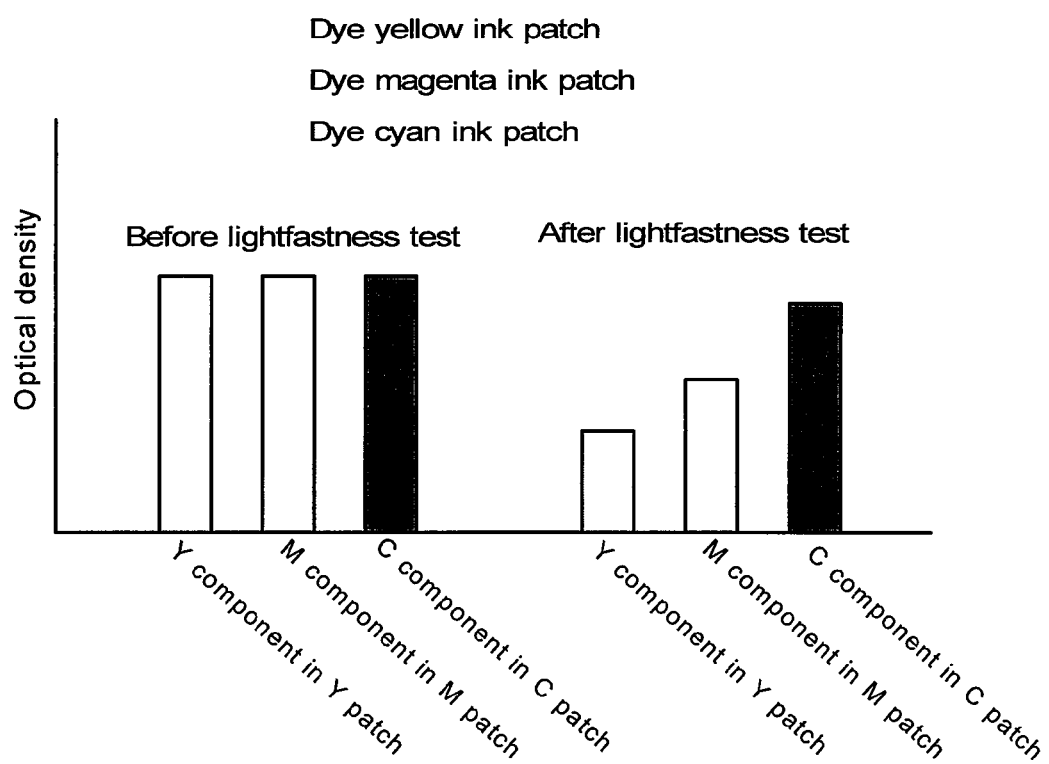
FIG. 2 is a schematic explanatory diagram showing a change in OD value between before and after a lightfastness test of each of a dye yellow ink patch printed with a dye yellow ink, a dye magenta ink patch printed with a dye magenta ink, and a dye cyan ink patch printed with a dye cyan ink.

As shown in FIG. 2, regarding the dye yellow ink patch, the dye magenta ink patch, and the dye cyan ink patch as well, even when the OD values before the lightfastness test of these patches are equal to each other, the reduction rates in OD values after the lightfastness test of these components are different from each other and variations between the OD values occur. Consequently, the composite black formed by using the dye yellow ink, the dye magenta ink, and the dye cyan ink in combination may feel color tint after the lightfastness test.

Figure 3:
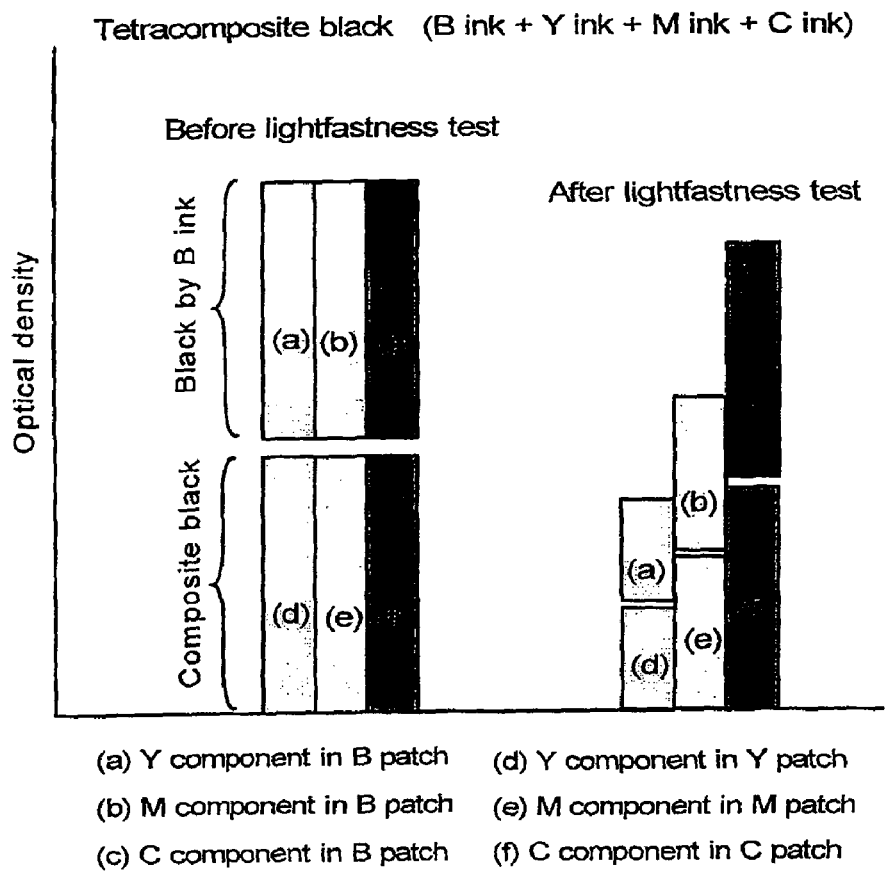
FIG. 3 is a schematic explanatory diagram showing a change in OD value between before and after a lightfastness test of each of a yellow component, a magenta component, and a cyan component in the case where a tetracomposite black image is produced by using, in combination, a dye black ink, a dye yellow ink, a dye magenta ink, and a dye cyan ink of a known ink set for ink-jet recording.

The above-described color tint of black due to the dye black ink and the color tint due to the composite black become further conspicuous in the case where a light achromatic region is formed by the dye black ink or the composite black. Furthermore, in the case where the tetracomposite black is formed by using the dye black ink, the dye yellow ink, the dye magenta ink, and the dye cyan ink in combination in order to eliminate the graininess of light achromatic region, as shown in FIG. 3, if a color component exhibiting a large reduction rate in OD value of the dye black ink patch and a color component exhibiting a large reduction rate in OD value among the dye yellow ink patch, the dye magenta ink patch, and the dye cyan ink patch are superimposed and a color component exhibiting a small reduction rate in OD value of the dye black ink patch and a color component exhibiting a small reduction rate in OD value among the dye yellow ink patch, the dye magenta ink patch, and the dye cyan ink patch are superimposed, the color tint of the achromatic region becomes further conspicuous.

Figure 4:
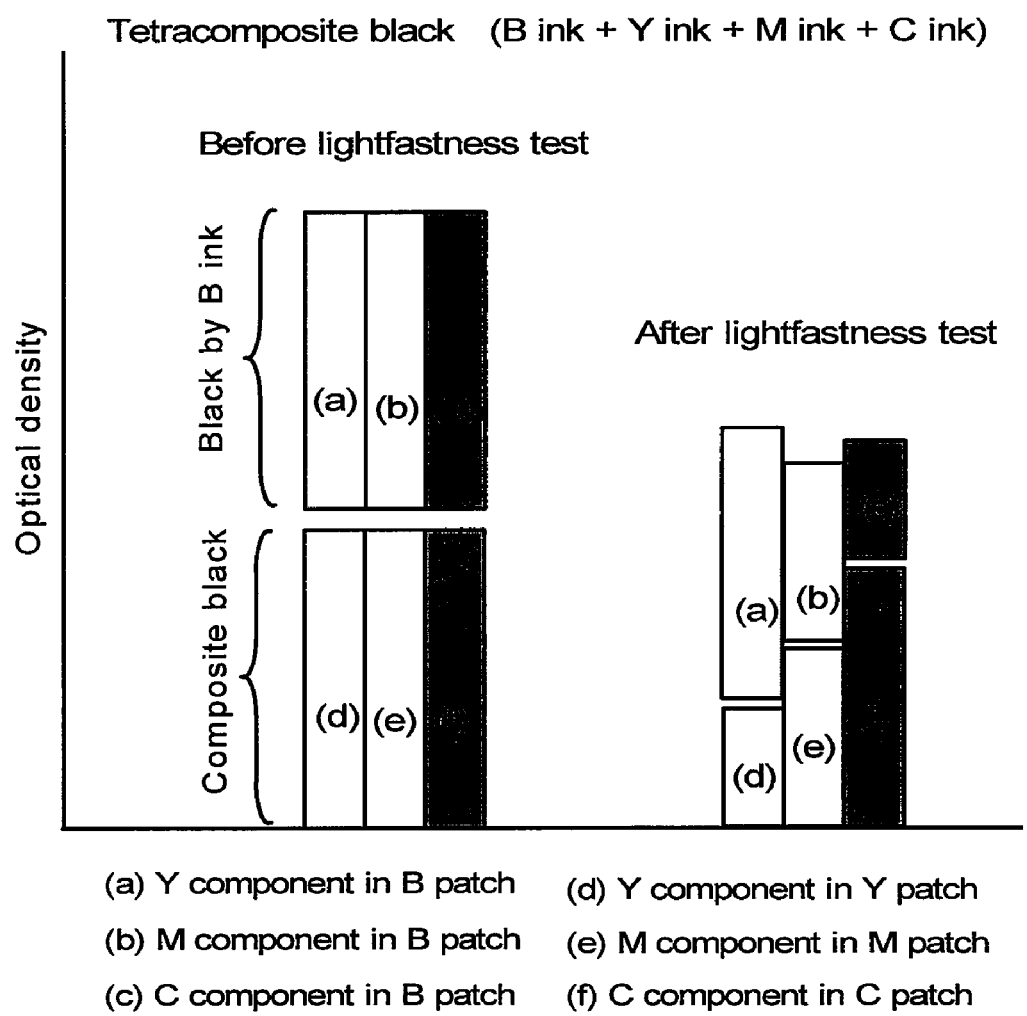
FIG. 4 is a schematic explanatory diagram showing a change in OD value between before and after a lightfastness test of each of a yellow component, a magenta component, and a cyan component in the case where a tetracomposite black image is produced by using, in combination, a dye black ink, a dye yellow ink, a dye magenta ink, and a dye cyan ink of a ink set for ink-jet recording according to an aspect of the present invention.

On the other hand, according to an aspect of the present invention, as shown in FIG. 4, the order of levels of reduction rates in OD values between before and after the lightfastness test of the yellow component, the magenta component, and the cyan component in the dye black ink patch is reverse to the order of levels of reduction rates in OD values between before and after the lightfastness test of the yellow component in the dye yellow ink patch, the magenta component in the dye magenta ink patch, and the cyan component in the dye cyan ink patch. Therefore, in the region in which the tetracomposite black is formed by using the dye black ink, the dye yellow ink, the dye magenta ink, and the dye cyan ink in combination, variations in OD values before and after the lightfastness test between these components are reduced as compared with those in the case where the achromatic region is formed by the dye black ink alone or the achromatic region is formed by the composite black composed of the dye yellow ink, the dye magenta ink, and the dye cyan ink. Consequently, according to the ink set of an aspect of the present invention, even when the produced image fades due to exposure to light, an achromatic region in the image may be prevented from being tinted unnaturally.

The ink set according to an aspect of the present invention may be produced by forming respective patches from dye yellow ink, dye magenta ink, dye cyan ink, and dye black ink, measuring the OD values of the yellow component in the dye yellow ink patch, the magenta component in the dye magenta ink patch, and the cyan component in the dye cyan ink patch, and OD values of the yellow component, the magenta component, and the cyan component in the dye black ink patch before and after the lightfastness test, calculating the respective reduction rates in OD values, and selecting the dye yellow ink, dye magenta ink, dye cyan ink, and dye black ink appropriately in such a way as to satisfy the above-described relationship in which the reversal of the order results.

In the selection of the inks, it is preferable that the difference between a maximum value and a minimum value among (By+Cy)/2, (Bm+Cm)/2, and (Bc+Cc)/2 is specified to be about 10% or less, where the reduction rate in OD value of the yellow component in the dye black ink patch is assumed to be By, the reduction rate in OD value of the magenta component in the dye black ink patch is assumed to be Bm, the reduction rate in OD value of the cyan component in the dye black ink patch is assumed to be Bc, the reduction rate in OD value of the yellow component in the dye yellow ink patch is assumed to be Cy, the reduction rate in OD value of the magenta component in the dye magenta ink patch is assumed to be Cm, and the reduction rate in OD value of the cyan component in the dye cyan ink patch is assumed to be Cc.

In this manner, the achromatic region formed by using the dye black ink, the dye yellow ink, the dye magenta ink, and the dye cyan ink in combination may be further reliably prevented from being tinted due to color fading.

The dye yellow ink, the dye magenta ink, the dye cyan ink, and the dye black ink constituting the ink set for ink-jet recording according to an aspect of the present invention may be prepared from known dyes, water, water-soluble organic solvents, and additives which are used as necessary.

Examples of dyes to be used for the dye black ink include, without limitation, dyes represented by the following General formula (Bk-a); C. I. Acid Black 2, 7, 24, 26, 31, 52, 63, 112, 118, and the like; C. I. Direct Black 17, 19, 32, 51, 71, 108, 146, 154, 168, and the like; C. I. Basic Black 2, and the like; C. I. Food Black 1, 2, and the like.

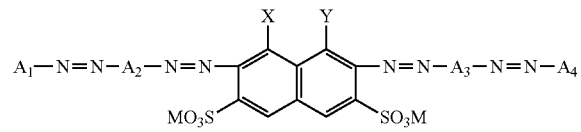

General formula (Bk-a)

In General formula (Bk-a), $A_1$ and $A_4$ represent independently a phenyl group which may be substituted or a naphthyl group which may be substituted, and $A_2$ and $A_3$ represent independently a naphthyl group which may be substituted. Each of components $A_1$, $A_2$, $A_3$, and $A_4$ includes at least one of sulfo group, and one of X and Y represents a hydroxyl group while the other represents an amino group. M represents a hydrogen atom, an alkali metal, a cation of an organic amine or an ammonium ion.

Examples of dyes to be used for the dye yellow ink, the dye magenta ink, and the dye cyan ink include, without limitation, yellow dyes such as C. I. Direct Yellow 12, 24, 26, 27, 28, 33, 39, 58, 86, 98, 100, 132, 142, 169 and the like, C. I. Acid Yellow 3, 11, 17, 19, 23, 25, 29, 38, 42, 49, 59, 61, 71, 72 and the like, C. I. Basic Yellow 40 and the like, C. I. Reactive Yellow 2 and the like; magenta dyes such as dyes represented by the following General formula (M-a) or General formula (M-b), C. I. Direct Red 4, 17, 28, 37, 63, 75, 79, 80, 81, 83, 254 and the like, C. I. Acid Red 1, 6, 8, 18, 32, 35, 37, 42, 52, 85, 88, 115, 133, 134, 154, 186, 249, 289, 407 and the like, C. I. Basic Red 9, 12, 13 and the like, C. I. Reactive Red 4, 23, 24, 31, 56 and the like; cyan dyes such as C. I. Direct Blue 1, 6, 8, 15, 22, 25, 71, 76, 80, 86, 87, 90, 106, 108, 123, 163, 165, 199, 226 and the like, C. I. Acid Blue 9, 22, 29, 40, 59, 62, 93, 102, 104, 112, 113, 117, 120, 167, 175, 183, 229, 234 and the like, C. I. Basic Blue 1, 3, 5, 7, 9, 24, 25, 26, 28, 29 and the like, C. I. Reactive Blue 7, 13, 49 and the like.

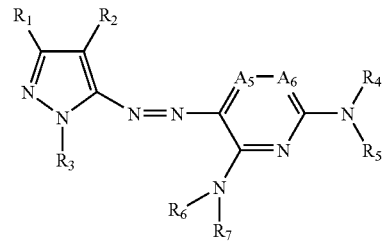

General formula (M-a)

In General formula (M-a), $R_1$ represents a hydrogen atom, an alkyl group which may be substituted or an aryl group which may be substituted. $R_2$ represents a hydrogen atom, a halogen atom or a cyano group. $R_3$ represents a hydrogen atom, an alkyl group which may be substituted, an aryl group which may be substituted or a heterocyclic group which may be substituted. $R_4$, $R_5$, $R_6$, and $R_7$ represent independently a hydrogen atom, an alkyl group which may be substituted, an aryl group which may be substituted, a heterocyclic group which may be substituted, a sulfonyl group which may be substituted or an acyl group which may be substituted. However, both $R_4$ and $R_5$ do not represent hydrogen atoms. Both $R_6$ and $R_7$ do not represent hydrogen atoms. Both $A_5$ and $A_6$ represent carbon atoms which may be substituted, or one of $A_5$ and $A_6$ represents a carbon atom which may be substituted and the other represents a nitrogen atom.

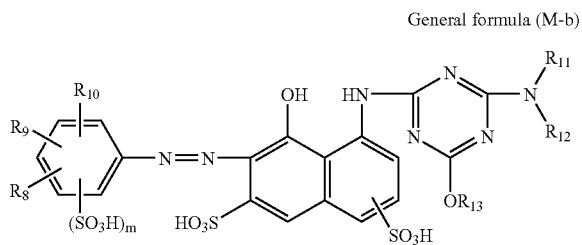

General formula (M-b)

In General formula (M-b), $R_8$, $R_9$ and $R_{10}$ represent independently an alkyl group which may be substituted, an alkoxy group which may be substituted, a halogen atom, a hydrogen atom, a hydroxyl group, a carbamoyl group which may be substituted, a sulfamoyl group which may be substituted, an amino group which may be substituted, a nitro group, a group of sulfonic acid ester, an alkylsulfonyl group which may be substituted, an arylsulfonyl group which may be substituted, a carboxyl group or a group of carboxylic acid ester. Subscript m represents a number of 0, 1 or 2. $R_{11}$, $R_{12}$, and $R_{13}$ represent independently a hydrogen atom, an alkyl group which may be substituted, an alkenyl group which may be substituted, an aryl group which may be substituted, an aralkyl group which may be substituted, an alicyclic group which may be substituted or a heterocyclic group which may be substituted.

It is preferable that deionized water is used as the water to be used for the inks constituting the ink set for ink-jet recording according to an aspect of the present invention.

The water-soluble organic solvent to be used for the inks constituting the ink set for ink-jet recording according to an aspect of the present invention primarily contains a humectant having an effect of preventing drying of the ink at an end portion of an ink-jet head, and a penetrant for controlling the drying rate on the paper surface.

Examples of humectants may include, without limitation, lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones or ketoalcohols such as acetone, diacetone alcohol, and the like; ethers such as tetrahydrofuran, dioxane, and the like; polyalkylene glycols such as polyethylene glycol, polypropylene glycol, and the like; alkylene glycols such as ethylene glycol, propylene glycol, butylene glycol, diethylene glycol, triethylene glycol, dipropylene glycol, tripropylene glycol, thiodiglycol, hexylene glycol, and the like; glycerin; 2-pyrrolidone; N-methyl-2-pyrrolidone; 1,3-dimethyl-2-imidazolidinone; and the like.

The amount of the humectant in each of the inks of the ink set for ink-jet recording may be 0 to about 95 wt. %, about 5 wt. % to about 80 wt. %, and about 5 wt. % to about 50 wt. %.

Examples of penetrant may include, without limitation, glycol based ethers such as ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, tripropylene glycol butyl ether, and the like.

The amount of the penetrant in each of the inks of the ink set for ink-jet recording may be 0 to about 20 wt. %, about 0.1 wt. % to about 15 wt. %, and about 1 wt. % to about 10 wt. %, because if the amount is too large, the permeability of the ink into the paper may become too high so as to cause bleeding.

If necessary, the inks constituting the ink set for ink-jet recording according to an aspect of the present invention may further contain previously known additives, such as a viscosity adjusting agent, e.g., polyvinyl alcohol, polyvinylpyrrolidone, and a water-soluble resin; a surface tension modifier; a mildew proofing agent; and a PH modifier.

The inks constituting the ink set for ink-jet recording according to an aspect of the present invention may be prepared by uniformly mixing a dye, water, a water-soluble organic solvent, and any of other additive component, and removing an insoluble matter with a filter.

The inks constituting the ink set for ink-jet recording according to an aspect of the present invention may be filled into ink cartridges of a previously known ink-jet printer and be used for ink-jet recording.

EXAMPLES

The present invention will be specifically described below with reference to the examples.

Examples 1 to 3, Comparative Examples 1 to 4

(1) Preparation of Ink

Dye black inks (Bk-1 and Bk-2), dye yellow inks (Y-1 and Y-2), dye magenta inks (M-1, M-2, M-3, and M-4), and dye cyan inks (C-1, C-2, C-3, and C-4) were prepared by uniformly mixing the components summarized in Table 1.

TABLE 1

(unit: wt. %)

| Ink component | Bk-1 | Bk-2 | Y-1 | Y-2 | M-1 | M-2 | M-3 | M-4 | C-1 | C-2 | C-3 | C-4 |
|---|---|---|---|---|---|---|---|---|---|---|---|---|
| Colorant | | | | | | | | | | | | |
| C.I. Direct Black 19 | 3.0 | — | — | — | — | — | — | — | — | — | — | — |
| C.I. Food Black 2 | — | 3.0 | — | — | — | — | — | — | — | — | — | — |
| C.I. Direct Yellow 132 | — | — | 3.0 | — | — | — | — | — | — | — | — | — |
| C.I. Direct Yellow 86 | — | — | — | 3.0 | — | — | — | — | — | — | — | — |
| Magenta dye (*1) | — | — | — | — | 3.0 | — | — | — | — | — | — | — |
| Magenta dye (*2) | — | — | — | — | — | 3.0 | — | — | — | — | — | — |
| C.I. Acid Red 289 | — | — | — | — | — | — | 3.0 | — | — | — | — | — |
| C.I. Direct Red 80 | — | — | — | — | — | — | — | 3.0 | — | — | — | — |
| Cyan dye (*3) | — | — | — | — | — | — | — | — | 3.0 | — | — | — |
| Cyan dye (*4) | — | — | — | — | — | — | — | — | — | 3.0 | — | — |
| C.I. Direct Blue 199 | — | — | — | — | — | — | — | — | — | — | 3.0 | — |
| C.I. Acid Blu 9 | — | — | — | — | — | — | — | — | — | — | — | 3.0 |
| Glycerin | 35.0 | 35.0 | 35.0 | 35.0 | 35.0 | 35.0 | 35.0 | 35.0 | 35.0 | 35.0 | 35.0 | 35.0 |
| Triethylene glycol n-butyl ether | 4.0 | 4.0 | 4.0 | 4.0 | 4.0 | 4.0 | 4.0 | 4.0 | 4.0 | 4.0 | 4.0 | 4.0 |
| Surfactant (*5) | 0.2 | 0.2 | 0.2 | 0.2 | 0.2 | 0.2 | 0.2 | 0.2 | 0.2 | 0.2 | 0.2 | 0.2 |
| Pure water | Bal (*6) | Bal (*6) | Bal (*6) | Bal (*6) | Bal (*6) | Bal (*6) | Bal (*6) | Bal (*6) | Bal (*6) | Bal (*6) | Bal (*6) | Bal (*6) |

Notes of Table 1

(*1)

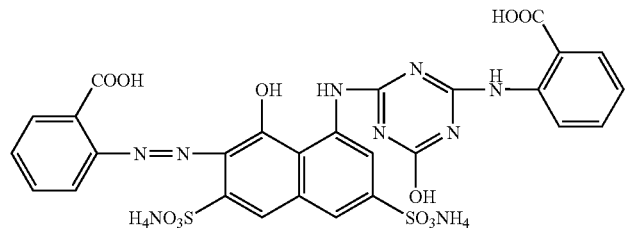

(*2)

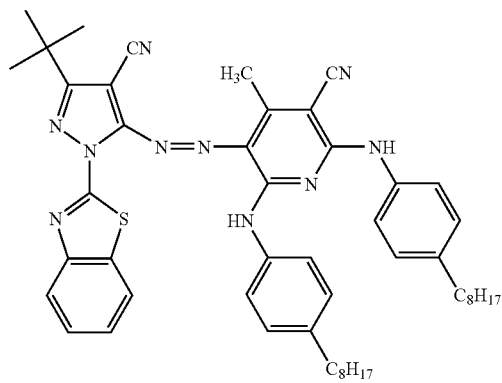

(*3)

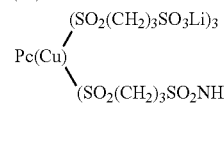

(*4)

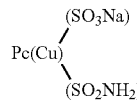

(*5) polyoxylauryl (12, 13) ether sodium sulfate (3E. O)

(*6) "Bal" is an abbreviation of "Balance".

(2) Production of Evaluation Patch

Each ink summarized in Table 1 was filled into a desired ink cartridge, the ink cartridge was mounted on an ink-jet printer-equipped digital multifunction device (DCP-115C; product of Brother Industries, Ltd.). The driver was set at "Fine printing", and a gradation sample of each ink was printed on glossy paper (glossy photo paper BP61GLA; product of Brother Industries, Ltd.). A patch exhibiting the OD value of about 1.0 was chosen as an evaluation patch.

The dye yellow ink, the dye magenta ink, the dye cyan ink (hereafter referred to as color inks), and the dye black ink were used in combination in such a way that the volume rate of each color ink to the black ink became 0.4 to 0.6:0.4 to 0.6, and a gradation sample of black was printed. A patch exhibiting the OD value of about 1.0 was chosen as a patch for evaluating tetracomposite black.

(3) Evaluation of Lightfastness (3-1) Lightfastness Test

The evaluation patch of the above-described item (2) was subjected to the lightfastness test as described below.

Each evaluation patch was irradiated with light having an illuminance of 93 klx for 100 hours by using High Energy Xenon Weather Meter SC750-WN; product of Suga Test Instruments Co., Ltd., under the condition of the temperature in the chamber of 25° C. and the relative humidity in the chamber of 50% while Xenon lamp light was used as a light source.

(3-2) Reduction Rate in OD Value

The OD values before and after a lightfastness test were measured with Spectrolino (light source: $D_{65}$; field of view: 2°; Status A) produced by Gretag Macbeth.

The reduction rate in OD value was calculated from the obtained OD values by the following equation.

Reduction rate in OD value(%)={(OD value before test−OD value after test)/OD value before test}× 100

The reductions rates in OD values of the yellow component, the magenta component, and the cyan component in the dye black ink patch were assumed to be By, Bm, and Bc, respectively. The reduction rates in OD values of the yellow component in the dye yellow ink patch, the magenta component in the dye magenta ink patch, and the cyan component in the dye cyan ink patch were assumed to be Cy, Cm, and Cc, respectively. Values of (By+Cy)/2, (Bm+Cm)/2, and (Bc+Cc)/2 were calculated and the difference between a maximum value thereof and a minimum value thereof was determined.

(3-3) Evaluation of Color Balance

The evaluation patch of the tetracomposite black before and after the lightfastness test was observed visually. In the case where well-balanced fading was observed regarding each color of yellow, magenta, and cyan after the lightfastness test and color tint was not conspicuous, evaluation resulted in G (Good). In the case where the color balance became undone and there was growing feeling of color tint, the evaluation resulted in NG (Not Good). The results thereof are summarized in Table 2.

In Examples 1, 2, and 3, the order of levels of reduction rates in OD values of the yellow component, the magenta component, and the cyan component in the dye black ink patch was reverse to the order of levels of reduction rates in OD values of the yellow component in the dye yellow ink patch, the magenta component in the dye magenta ink patch, and the cyan component in the dye cyan ink patch. The color balance was good after the lightfastness test.

In Comparative Example 1, the order of levels of reduction rates in OD values of the yellow component, the magenta component, and the cyan component in the dye black ink patch was as below.

Yellow component<Magenta component<Cyan component

The order of the yellow component in the dye yellow ink patch, the magenta component in the dye magenta ink patch, and the cyan component in the dye cyan ink patch was as below.

Magenta component<Yellow component<Cyan component

These orders were not reversed to each other, and therefore the color balance was poor after the lightfastness test.

In Comparative Example 2, the order of levels of reduction rates in OD values of the yellow component, the magenta component, and the cyan component in the dye black ink patch was as below.

Yellow component<Magenta component<Cyan component

The order of levels of reduction rates in OD values of the yellow component in the dye yellow ink patch, the magenta component in the dye magenta ink patch, and the cyan component in the dye cyan ink patch was as below.

Yellow component<Magenta component<Cyan component

These orders were not reversed to each other, and therefore the color balance was poor after the lightfastness test.

In Comparative Example 3, the order of levels of reduction rates in OD values of the yellow component, the magenta component, and the cyan component in the dye black ink patch was as below.

Yellow component<Magenta component<Cyan component

The order of levels of reduction rates in OD values of the yellow component in the dye yellow ink patch, the magenta component in the dye magenta ink patch, and the cyan component in the dye cyan ink patch was as below.

Cyan component<Yellow component<Magenta component

These orders were not reversed to each other, and therefore the color balance was poor after the lightfastness test.

In Comparative Example 4, the order of levels of reduction rates in OD values of the yellow component, the magenta component, and the cyan component in the dye black ink patch was as below.

Yellow component<Magenta component<Cyan component

The order of levels of reduction rates in OD values of the yellow component in the dye yellow ink patch, the magenta component in the dye magenta ink patch, and the cyan component in the dye cyan ink patch was as below.

Magenta component<Cyan component<Yellow component

These orders were not reversed to each other, and therefore the color balance was poor after the lightfastness test.

TABLE 2

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Evaluation of dye black ink patch | Dye black ink | Bk-1 | Bk-1 | Bk-2 | Bk-1 | Bk-1 | Bk-2 | Bk-1 |
|  | Order of reduction rate in OD value | Y < M < C | Y < M < C | Y < M < C | Y < M < C | Y < M < C | Y < M < C | Y < M < C |
|  | Reduction rate in OD value (By) of yellow component (Y) | 20% | 20% | 12% | 20% | 20% | 12% | 20% |
|  | Reduction rate in OD value (Bm) of magenta component (M) | 32% | 32% | 22% | 32% | 32% | 22% | 32% |
|  | Reduction rate in OD value (Bc) of cyan component (C) | 44% | 44% | 32% | 44% | 44% | 32% | 44% |
| Evaluation of dye yellow ink patch, dye magenta ink patch, and dye cyan ink patch | Dye yellow ink | Y-2 | Y-1 | Y-2 | Y-1 | Y-1 | Y-2 | Y-1 |
|  | Reduction rate in OD value (Cy) of yellow component (Y) | 8% | 12% | 8% | 12% | 12% | 8% | 12% |
|  | Dye magenta ink | M-2 | M-2 | M-2 | M-2 | M-4 | M-3 | M-1 |
|  | Reduction rate in OD value (Cm) of magenta component (M) | 6% | 6% | 6% | 6% | 17% | 35% | 6% |
|  | Dye cyan ink | C-2 | C-1 | C-1 | C-4 | C-4 | C-2 | C-3 |
|  | Reduction rate in OD value (Cc) of cyan component (C) | 2% | 4% | 4% | 90% | 90% | 2% | 10% |
|  | Order of Reduction rate in OD value | Y > M > C | Y > M > C | Y > M > C | C > Y > M | C > M > Y | M > Y > C | Y > C > M |
| Dye black ink patch + dye yellow ink patch, dye magenta ink patch, and dye cyan ink patch | (By + Cy)/2 | 14.0% | 16.0% | 10.0% | 16.0% | 16.0% | 10.0% | 16.0% |
|  | (Bm + Cm)/2 | 19.0% | 19.0% | 14.0% | 19.0% | 24.5% | 28.5% | 19.0% |
|  | (Bc + Cc)/2 | 23.0% | 24.0% | 18.0% | 67.0% | 67.0% | 17.0% | 27.0% |
|  | Difference between maximum value and minimum value | 9.0% | 8.0% | 8.0% | 51.0% | 51.0% | 18.5% | 11.0% |
|  | Evaluation of color balance | G | G | G | NG | NG | NG | NG |

Ex.: Example Comp.
Ex.: Comparative example

The present invention is not limited to the embodiments described in the Examples, which are provided for illustrative purposes only. It will be apparent that various modifications can be made without departing from the spirit and the scope of the present invention as described and claimed herein.

What is claimed is:

1. A method for producing a tetracomposite black image, the method comprising the step of producing the tetracomposite black image containing a dye yellow ink, a dye magenta ink, a dye cyan ink, and a dye black ink in combination by using an ink set for inkjet recording, the ink set comprising the dye yellow ink, the dye magenta ink, the dye cyan ink, and the dye black ink, wherein regarding a reduction rate in OD value between before and after a predetermined lightfastness test of each patch in the case where the patch of each of the dye yellow ink, the dye magenta ink, the dye cyan ink, and the dye black ink is formed and the resulting patch is subjected to the lightfastness test, the order of levels of reduction rates in OD values of a yellow component, a magenta component, and a cyan component in the dye black ink patch is reverse to the order of levels of reduction rates in OD values of a yellow component in the dye yellow ink patch, a magenta component in the dye magenta ink patch, and a cyan component in the dye cyan ink patch.

2. The method for producing a tetracomposite black image according to claim 1, wherein the difference between a maximum value and a minimum value among (By+Cy)/2, (Bm+Cm)/2, and (Bc+Cc)/2 is about 10% or less, where the reduction rate (%) in OD value of the yellow component in the dye black ink patch is assumed to be By, the reduction rate (%) in OD value of the magenta component in the dye black ink patch is assumed to be Bm, the reduction rate (%) in OD value of the cyan component in the dye black ink patch is assumed to be Bc, the reduction rate (%) in OD value of the yellow component in the dye yellow ink patch is assumed to be Cy, the reduction rate (%) in OD value of the magenta component in the dye magenta ink patch is assumed to be Cm, and the reduction rate (%) in OD value of the cyan component in the dye cyan ink patch is assumed to be Cc.

* * * * *